UNITED STATES PATENT OFFICE.

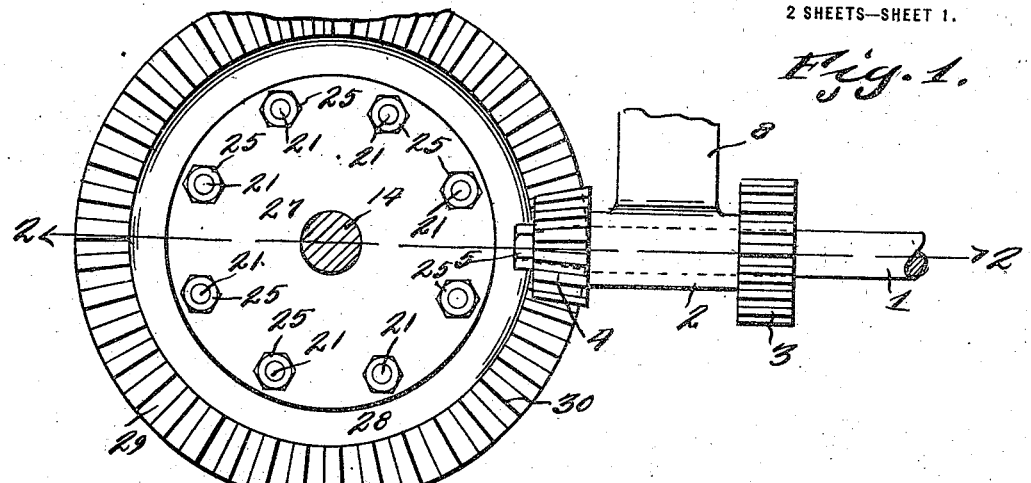
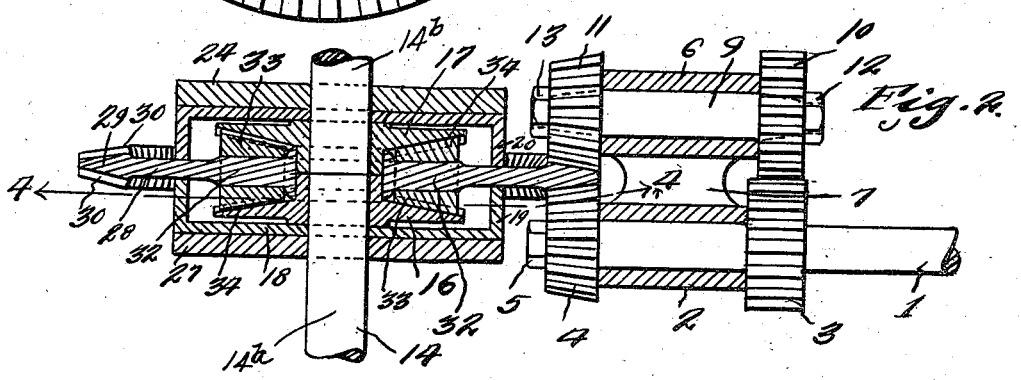
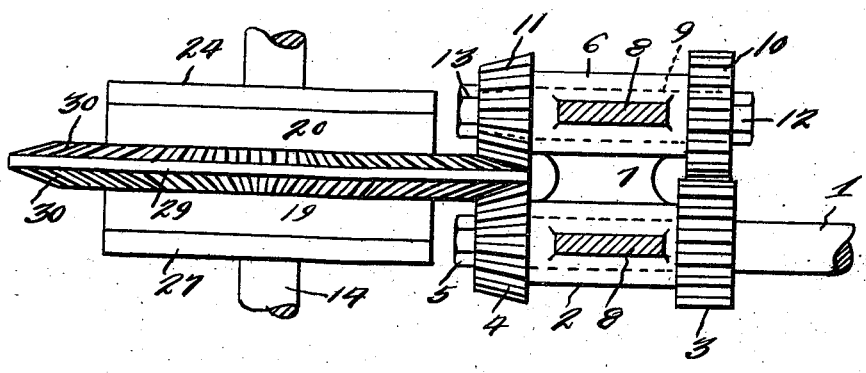

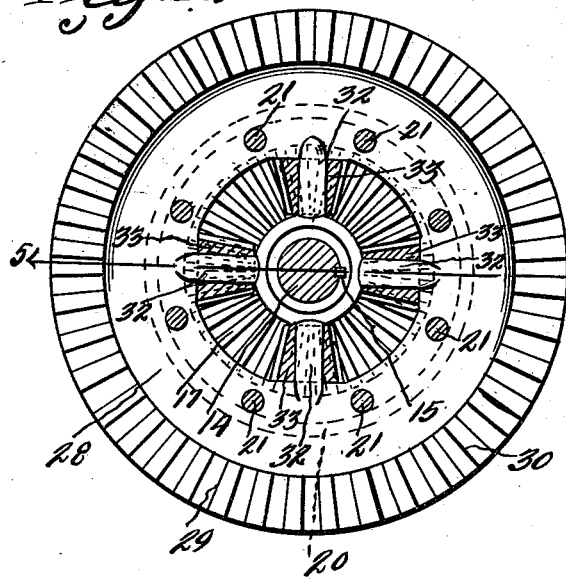
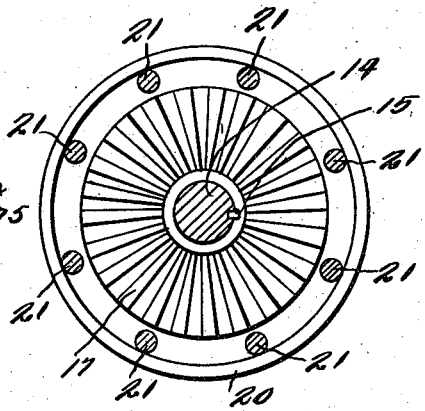
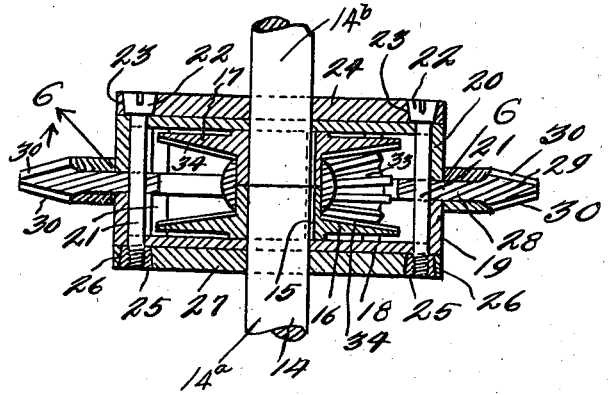

WILLIAM J. McINISH, OF TALLASSEE, ALABAMA.

GEARING.

1,244,223.  Specification of Letters Patent.  Patented Oct. 23, 1917.

Application filed May 3, 1916. Serial No. 95,206.

*To all whom it may concern:*

Be it known that I, WILLIAM J. MCINISH, a citizen of the United States, residing at Tallassee, in the county of Elmore, State of Alabama, have invented a new and useful Gearing; and I do hereby declare the following to be a full, clear, and exact description of the invention, such as will enable others skilled in the art to which it appertains to make and use the same.

This invention relates to the art of machine elements and more especially to an improved gearing more particularly adapted for use for transmitting power from the main drive shaft of the engine of an automobile to the drive axle of the machine.

One of the objects of the invention is to provide an improved gearing of this kind having means for balancing or equalizing the friction on the main drive gear, between the driving shaft and the driven shaft.

Another object of the invention is to provide such drive gearing as to prevent teeth stripping.

A further object of the invention is to provide means upon both sides of the main drive gear for holding the driving gears true to their work and in alinement, to prevent teeth stripping.

In practical fields, the details of construction may necessitate alterations, falling within the scope of what is claimed.

The invention comprises further features and combinations of parts, as hereinafter set forth, shown in the drawings, and claimed.

In the drawings,

Figure 1 is a view in side elevation of the driving gear mechanism between the engine driven shaft and the driving axle of an automobile.

Fig. 2 is a sectional view on line 2—2 of Fig. 1.

Fig. 3 is a plan view of Fig. 1.

Fig. 4 is a sectional view on line 4—4 of Fig. 2.

Fig. 5 is a sectional view on line 5—5 of Fig. 4.

Fig. 6 is a sectional view on line 6—6 of Fig. 5.

Referring more especially to the drawings, 1 designates the drive shaft from the engine of an automobile, and which shaft is mounted in a suitable bearing 2, and is provided with a gear 3 and a bevel gear 4, there being a nut 5 for holding the bevel gear 4 on the shaft 1. A second bearing 6 is provided, which is constructed integral with the bearing 2, by means of the connecting part 7. These bearings 2 and 6 are formed integral with the lower end of a hanger 8, which extends down from the frame of the machine, not shown. Mounted in the bearing 6 is an auxiliary shaft 9, having a gear 10 on one end, and a bevel gear 11 upon its opposite end, there being nuts 12 and 13 for holding the gear 10 and bevel gear 11 on said shaft 9. The gear 10 meshes with the gear 3, so that the revoluble motion of the engine driven shaft 1 is transmitted to the shaft 9. 14 designates the drive axle of the automobile, and splined or feathered or keyed, as shown at 15, upon the two sections 14$^a$ and 14$^b$ of the shaft 14 are two bevel gears 16 and 17, the toothed faces of which oppose each other. A casing 18 is loosely mounted upon the shaft 14 and incloses the gears 16 and 17 and prevents axial movement of the same. The casing 18 consists of two parts 19 and 20 which are held together by means of the bolts 21, the heads 22 of which are conical or tapered slightly, and are fitted into openings 23 of the lock washer plate 24. The other ends of the bolts 21 have nuts 25 threaded thereon, the outer circumference of which nuts are conical or tapered slightly, correspondingly to the heads 22, in order to fit the openings 26 of the lock washer plate 27. Clamped between the two parts 19 and 20 of the casing 18 is the flange 28 of the double bevel gear ring 29, the teeth 30 of which mesh between the bevel gears 4 and 11, as shown clearly in Fig. 2. It is to be noted that by the provision of the arrangement of the shaft 1 and the auxiliary shaft 9, and the bevel gears 4 and 11 engaging upon opposite sides of the double bevel gear ring 29, the said ring 29 is held in true alinement, and the teeth 30 are prevented from being stripped. Furthermore, by this arrangement and construction, all the friction incident to the intermeshing teeth is substantially equalized or balanced, thereby assisting in increasing the efficiency of such gear connection, between the driving parts and the driven parts. As shown in Fig. 5, it will be seen that the bolts 21 pass through the flange 28, thereby holding the ring 29 secure and rigid relative to the casing 18 Extending radially from the flange 28 of the ring 29 is a plurality of stems 32, upon which a plurality of bevel pinions 33 are journaled. These pinions 33 mesh between the toothed faces 34 of the bevel gears 16 and 17, whereby motion may be imparted to the two sections of the shaft 14. Therefore, it will be seen that by motion being imparted to the ring 29, the casing 18 will move therewith and, moreover, by reason of the bevel gears 33 being carried by the stems 32, there is a positive connection between the bevel pinions 33 and the bevel gears 16 and 17 when the gears are rotating in unison or together. But if the machine is making a turn, the two sections of the shaft 14 will rotate at different rates of speed, hence, the beveled gears will rotate at different speeds relative to each other and relative to the gears 33. The main feature of this driving gear connection is the double toothed face of the ring 29, engaging between the correspondingly bevel pinions 4 and 11, to insure against teeth stripping, and maintain true alinement between the coöperating parts.

The invention having been set forth, what is claimed as new and useful is:—

1. In a gearing as set forth, the combination with a driven member and a driving member, of a pair of bevel gears mounted upon said driven member with their bevel gear faces toward each other and having adjacent bearing extensions, an annular ring having its opposite faces provided with bevel gear teeth and provided with an inwardly extending annular flange, said flange having a plurality of radial stems engaging the extensions of said bevel gears, bevel pinions journaled on said stems and meshing with the teeth of said bevel gears, a casing mounted upon the driven member and consisting of two sections, each fitting over one of said bevel gears and each having an annular flange engaging the flange of said ring, lock washer plates on the driven member, one adjacent an outer face of each section of the casing, bolts extending through the sections of the casing and the flange of the ring and provided with tapering heads and nuts countersunk in said washer plates, thereby holding the parts together and preventing axial movement of said bevel gears and their disengagement from said pinions, and edgewise opposing bevel gears having operative connections with the driving member and engaging the bevel teeth of said ring to impart movement thereto.

2. In a gearing as set forth, the combination with a driven member and a driving member, of an annular ring having opposite bevel gear teeth, gear connections between the driven member and the teeth of the annular ring, a casing on said driven member consisting of two sections, one engaging each face of said ring, thereby preventing axial movement of the ring and its gear connection with said driven member, lock washer plates, one adjacent an outer face of each section, bolts extending through said sections and through the ring and provided with tapering heads and nuts countersunk in said lock washer plates to hold the parts together, and edgewise opposed bevel gears provided with operative connections with said driving member and engaging the opposite bevel gear teeth of said ring to impart movement thereto.

In testimony whereof I have signed my name to this specification in the presence of two subscribing witnesses.

WILLIAM J. McINISH.

Witnesses:
   W. D. MULLINS,
   G. B. JOHNSON.